United States Patent [19]

Takasaki

[11] Patent Number: 5,584,538
[45] Date of Patent: Dec. 17, 1996

[54] BRAKE SYSTEM WITH AUTOMATIC BRAKING MECHANISM

[75] Inventor: Yoshiyasu Takasaki, Higashimatsuyama, Japan

[73] Assignee: Jidosha Kiki Co., Ltd., Tokyo, Japan

[21] Appl. No.: 572,864

[22] Filed: Dec. 14, 1995

[30] Foreign Application Priority Data

Jan. 13, 1995 [JP] Japan ............................. 7-003859

[51] Int. Cl.$^6$ ................................................. B60R 25/08
[52] U.S. Cl. ............................. 303/89; 303/10; 477/197; 188/353
[58] Field of Search ................................. 303/125, 188, 303/139, 113.2, 113.3, 3, 10, 89; 188/265, 353; 477/194, 197

[56] References Cited

U.S. PATENT DOCUMENTS

| | | | |
|---|---|---|---|
| 3,941,127 | 3/1976 | Harries | 303/10 X |
| 4,480,877 | 11/1984 | Resch | 303/113.5 X |
| 4,805,965 | 2/1989 | Jonner et al. | 303/113.2 |
| 4,805,967 | 2/1989 | Arikawa | 303/10 X |
| 4,934,762 | 6/1990 | Sato | 303/139 X |
| 5,403,076 | 4/1995 | Altmann et al. | 303/125 |
| 5,505,528 | 4/1996 | Hamman et al. | 188/353 X |

*Primary Examiner*—Lee W. Young
*Attorney, Agent, or Firm*—Kanesaka & Takeuchi

[57] ABSTRACT

In a brake system with an automatic braking mechanism of the present invention, a master cylinder pressure developed by pedaling a brake pedal 1 is supplied to wheel cylinders through first and second brake paths 6,7, first and second center valves 26', 26 and first and second outlets 24', 24 of an automatic broke actuator 8 so that the normal brake is actuated. An electronic control unit (ECU) 40 actuates a thrust generator 38 and thus an automatic braking signal pressure is developed, whereby first and second small-diameter pistons 18', 18 and first and second large-diameter pistons 16', 16 are moved forward to close the first and second center valves 26', 26 to develop pressures which are supplied to the Wheel cylinders, with the result that the automatic brake is actuated. While the normal brake is operating, the automatic brake is actuated by that the thrust generator 38 actuates the automatic brake actuator 8, and while the automatic brake is operating, the normal broke is actuated by pedaling the brake pedal 1.

12 Claims, 4 Drawing Sheets

BRAKE SYSTEM WITH AUTOMATIC BRAKING MECHANISM

BACKGROUND OF THE INVENTION

The present invention relates to a brake system with an automatic braking mechanism which is used, such as, for enabling a driver of a vehicle to easily start the vehicle on a slopping road, for enable the driver to brake the vehicle for waiting a red light or in a traffic jam without continuously pedaling a brake pedal, for operating a traction control when a driving wheel slips, for holding the vehicle in a stopped state on a sloping road, for controlling the distance between the vehicle and a forward vehicle while running, for controlling the speed of the vehicle to prevent an excessive speed due to a slope, or for preventing the driver front forgetting to actuate a side brake.

As for an automobile, a brake system with an automatic braking mechanism has been recently developed. The automatic braking mechanism is used, such as, for enabling a driver of a vehicle to easily start the vehicle on a sloping road without rapidly repedaling from a brake pedal or parking brake to an accelerator, for lightening the fatigue of the driver due to the braking operation by enabling the driver to brake the vehicle for waiting a red light or in a traffic jam without continuously pedaling a brake pedal, for ensuring the stating or acceleration of the vehicle upon operating a traction control when a driving wheel slips, for automatically controlling the distance between the vehicle and a forward vehicle while running, for controlling the speed of the vehicle to prevent an excessive speed due to a slope, or for preventing the driver from forgetting to actuate a side brake.

Figure 5:
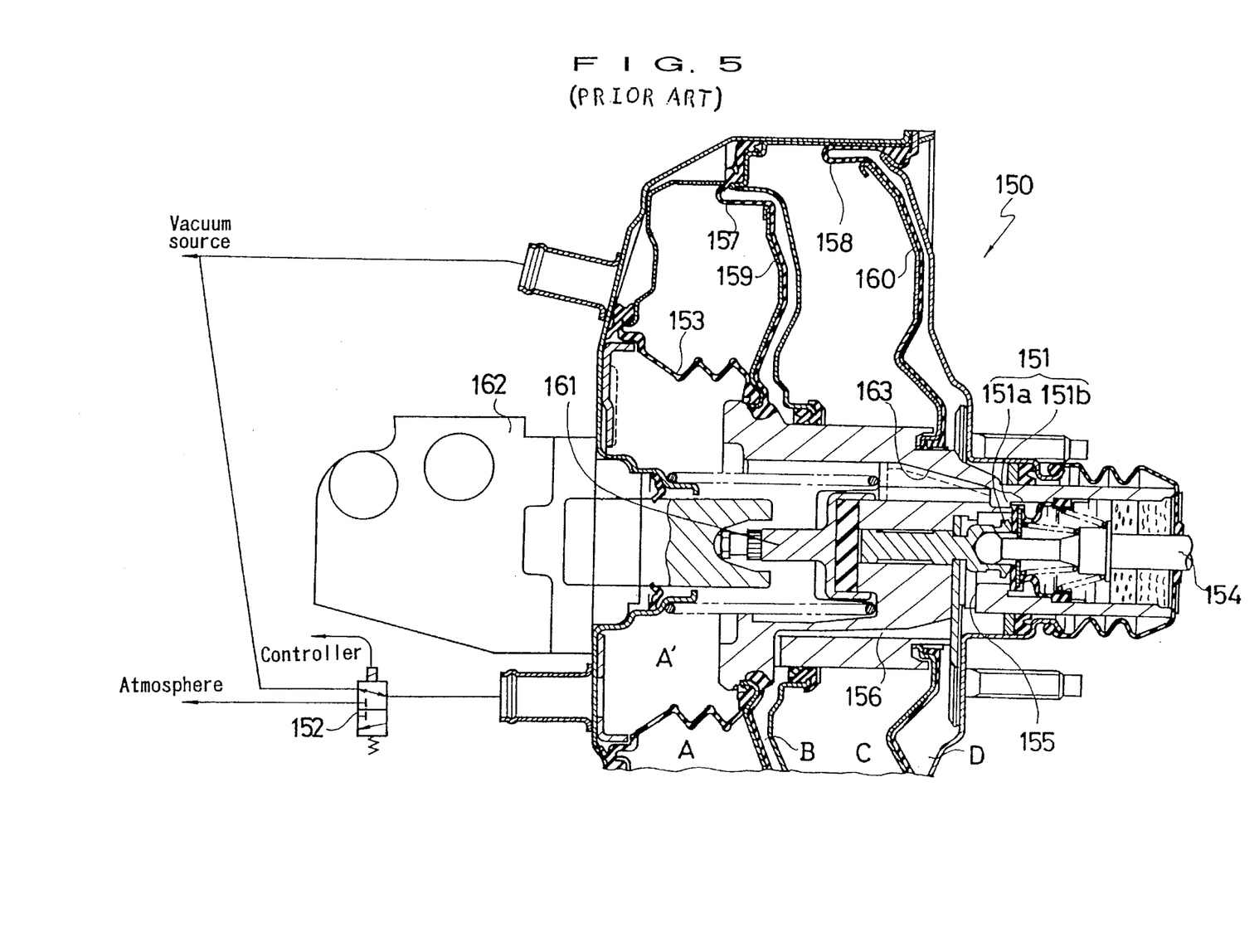
FIG. 5 is a view schematically and partially showing a conventional brake system with an automatic braking mechanism.

Japanese Published Unexamined Patent Application No. H4-292256 disclosed, as shown in FIG. 5, such a brake system with an automatic braking mechanism as an conventional one.

The brake system shown in FIG. 5 is provided with a vacuum servo unit of tandem type. In this figure, the vacuum servo unit 150 is in a non-braking state in which a breather valve 151a of a valve mechanism 151 is closed and a vacuum valve 151b is opened so that chambers A, B, C, D are vacuumed. In addition, a solenoid valve 152 is normally set in a shown position so that a chamber A' surrounded by bellows 153 is normally vacuumed.

In the non-braking state, as an input shaft 154 advances upon pedaling the brake pedal (not shown) for normal braking, the breather valve 151a of the valve mechanism 151 is opened and the vacuum valve 151b is closed so that the atmosphere is introduced into the transformer chambers B and D through the transformer paths 155 and 156, respectively. Therefore, differential pressures are developed between front and rear chambers A, B and C, D of diaphragms 157, 158, the diaphragms 157, 158 and power pistons 159, 160 thus advance, an output is produced from an output shaft 161, and a master cylinder 162 operates in response to the output to actuate the normal brake.

The advances of diaphragms 157, 158 and the power pistons 159, 160 continue until the breather valve 151a is closed not to introduce the atmosphere into the transformer chambers B, D. As a result of this, the outputs become outputs magnified at a predetermined servo ratio corresponding to the input, i.e. the amount of pedaling the brake pedal. In this state, both the breather valve 151a and the vacuum valve 151b of the valve mechanism 151 are closed.

On the other hand, in the non-braking state, as the solenoid valve 152 is switched by the controller when the vehicle is in automatic braking condition that the automatic braking mechanism has to be actuated, the atmosphere is introduced into the chamber A' and further introduced into the transformer chambers B, D through a constant pressure path 163, the opened vacuum valve 151b, and the transformer paths 155 and 156, respectively. Therefore, the diaphragms 157, 158 and the power pistons 159, 160 advance to actuate the brake similarly to the aforementioned normal braking. Thus, the automatic brake is actuated upon switching the solenoid valve 152 in response to the control signal from the controller when the vehicle is in the automatic braking condition.

In this conventional brake system with the automatic braking mechanism, however, while the driver pedals the brake pedal to operate the normal braking, the vacuum valve 151b is closed to block the communication between the constant pressure path 163 and the transformer path 155. Therefore, while pedaling the brake pedal, even when the vehicle is in the automatic braking condition and the solenoid valve 152 is thus switched by the controller so that the atmosphere is introduced into the chamber A' and the constant pressure path 163, the atmosphere is not introduced into the transformer path 155. Accordingly, while pedaling the brake pedal, the automatic brake can not be actuated even when the vehicle is in the automatic braking condition.

SUMMARY OF THE INVENTION

It is an object of the present invention to provide a brake system with an automatic braking mechanism in which the automatic brake can be securely actuated even while the normal brake is operating by pedaling the brake pedal and the normal brake can be securely actuated even while the automatic brake is operating.

In order to achieve this object, the present invention provides a brake system with an automatic braking mechanism comprising a brake operation member, a master cylinder for developing a master cylinder pressure by the operation of the brake operation member, a brake path for supplying the master cylinder pressure, brake cylinders for generating braking force for actuating a normal brake by receiving the master cylinder pressure, an automatic brake actuator provided in the brake path, a thrust generator for generating thrust starting the automatic brake actuator, and a control unit for controlling the actuation of the thrust generator, wherein the automatic brake actuator comprises a housing, a stepped hole which is formed in the housing and comprises of a large-diameter hole and a small-diameter hole, a large-diameter piston sealingly and slidably arranged into the large-diameter hole, a small-diameter piston sealingly and slidably arranged into the small-diameter hole, one end of which comes in contact with one end of the large-diameter piston to move the large-diameter piston forward, an automatic brake actuator inlet which is formed in the housing and communicates with an outlet of the master cylinder and with the large-diameter hole at one end side of the large-diameter piston through the brake path, an automatic brake actuator outlet which is formed in the housing and communicates with brake cylinders and with the large-diameter hole at the other end side of the large-diameter piston, a switch valve which is normally opened to communicate the automatic brake actuator inlet with the automatic brake actuator outlet and is closed to block the communication between the automatic brake actuator inlet and the automatic brake actuator outlet when the large-diameter piston advances toward the automatic brake actuator outlet, an automatic braking signal pressure developing piston which is moved forward by being in contact with an output rod and by the thrust of the thrust generator, and an automatic braking signal pressure introduction path for introducing the automatic braking signal pressure to the other end of the small-diameter piston.

The present invention is characterized in that the switch valve is composed of a center valve mounted to the large-diameter piston.

Further, the present invention is characterized in that the brake system comprises two brake circuits, the automatic brake actuator is arranged to the brake path of each brake circuit, and the automatic braking signal pressure introduction path is formed to introduce the automatic braking signal pressure to the other end of the small-diameter piston of each automatic brake actuator.

Furthermore, the present invention is characterized in that each automatic brake actuator is arranged in the common housing, the automatic braking signal pressure introduction path and the automatic braking signal pressure developing piston are disposed in the housing, the large-diameter piston and the small-diameter piston of each automatic brake actuator are coaxially arranged in the housing, and the automatic braking signal pressure introduction path is formed in a T-shaped path to communicate to the other end of the small-diameter piston of each automatic brake actuator.

In addition, the present invention is characterized in that the power source of the thrust generator is a vacuum, compressed air, liquid pressure, power generated by an electric motor, or electromagnetic force.

In the present invention as structured above, in case of the normal brake, the master cylinder develops the master cylinder pressure by the brake operation of the brake operation member and the master cylinder pressure is supplied to the brake cylinders through the brake path, the automatic actuator inlet, the switch valve, and the automatic brake actuator outlet, with the result that the normal brake is actuated. In addition, when the vehicle is in the automatic braking condition, the control unit actuates the thrust generator and then the thrust generator generates thrust whereby the automatic braking signal pressure deploying piston is moved forward. The forward movement of the large-diameter piston closes the switch valve to develop an automatic braking pressure so that the automatic braking pressure is supplied to the brake cylinders, with the result that the automatic brake is actuated.

Furthermore, when the vehicle is in the automatic braking condition while the normal brake is actuated by pedaling the brake pedal, the automatic braking signal pressure developing piston is moved forward by the thrust from the thrust generator to develop the automatic braking signal pressure, as mentioned above. When the automatic braking signal pressure is smaller than the master cylinder pressure developed by pedaling the brake pedal, the small-diameter piston and the large-diameter piston are not moved forward so that the brake cylinder pressure is held constantly to the master cylinder pressure. When the automatic braking signal pressure becomes larger than the master cylinder pressure, the small-diameter piston and the large-diameter piston are moved forward to develop the pressure. Because of this pressure, the braking pressure is increased linearly with the increase of the thrust. The pressure of the brake cylinders relative to the same thrust of the thrust generator at this point is increased by a pressure which is determined by subtracting the brake cylinder pressure, developed when the thrust F of the thrust generator 38 during the automatic braking, from the brake cylinder pressure developed by pedaling the brake pedal.

When the drive pedals the brake pedal while the automatic brake is operating, the master cylinder develops the master cylinder pressure and the master cylinder pressure is introduced into one end of the large-diameter piston of the automatic brake actuator. Since the switch valve is closed due to the operation of the automatic brake, the master cylinder pressure acts to move the large-diameter piston forward with the automatic braking signal pressure. In this manner, the brake cylinder pressure is linearly increased with the increase of the master cylinder pressure. Therefore, the normal brake can be actuated besides the automatic brake substantially at the same time that the driver pedals the brake pedal, thereby improving the responsibility. The upgrade slope of the brake cylinder pressure at this point acts in a direction that the master cylinder pressure moves backward the first and second small-diameter pistons pushing the first and second large-diameter pistons by the automatic braking signal pressure so that the upgrade slope become smaller than that in case of the single operation of the normal brake. As the master cylinder pressure increases and thus is equal to the brake cylinder pressure, the brake cylinder pressure increases in proportion to the increase of the master cylinder pressures. In this manner, the normal brake is actuated while the automatic brake is operating so that the braking force is increased by the operation of the normal brake.

Furthermore, even when a component for the normal brake such as a master cylinder fails, the thrust generator operates to develop the automatic braking signal pressure whereby the automatic brake is actuated, and even when a component for the automatic brake such as the thrust generator or the automatic brake actuator fails, the driver pedals the brake pedal to develop the master cylinder pressure whereby the normal brake is actuated. Therefore, the brake system of the present invention has a fail-safe function.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
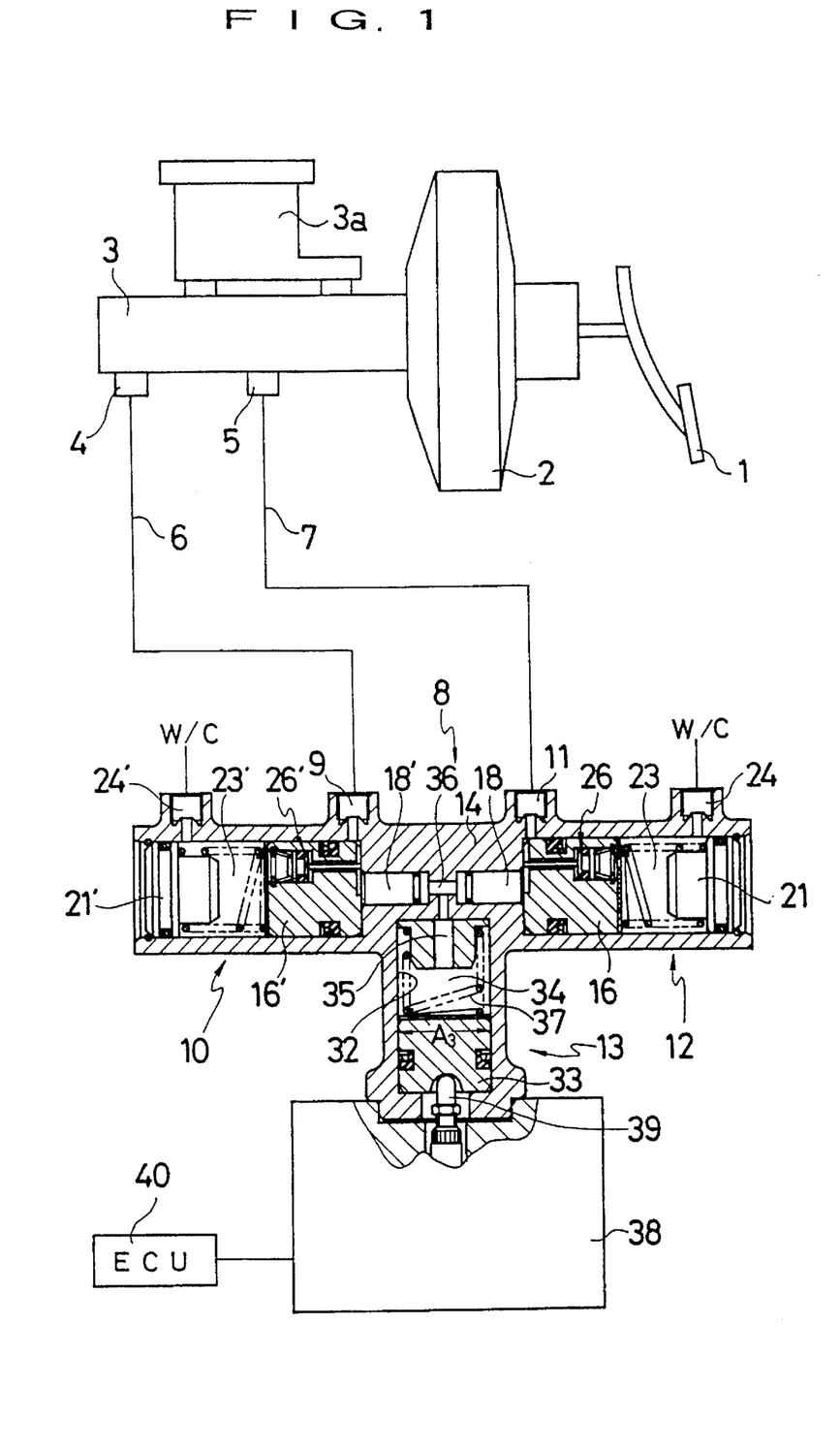
FIG. 1 is a view showing one embodiment of a brake system with an automatic braking mechanism in accordance with the present invention.

As shown in FIG. 1, a brake system with an automatic braking mechanism comprises a brake pedal 1 which is a brake operational member for actuating a normal brake similarly to a conventional normal brake device, a well-known vacuum servo unit 2 of single type or tandem type for magnifying the force of pedaling the brake pedal 1 at a predetermined servo ratio and outputting the magnified force, and a well-known tandem master cylinder 3 which is actuated by the output of the vacuum servo unit 2 to develop a braking pressure. First and second outlets 4 and 5 of the tandem master cylinder 3 are connected to one ends of first and second brake paths 6 and 7, respectively. The other ends of the first and second brake paths 6 and 7 are connected to an automatic brake actuator 8 for developing braking pressures of the automatic brake.

The automatic brake actuator 8 comprises a first cylinder 10 having a first inlet 9 which is connected to the first brake path 6, a second cylinder 12 having a second inlet 11 which is connected to the second brake path 7, and a third cylinder 13 for generating an automatic braking signal pressure.

Figure 2:
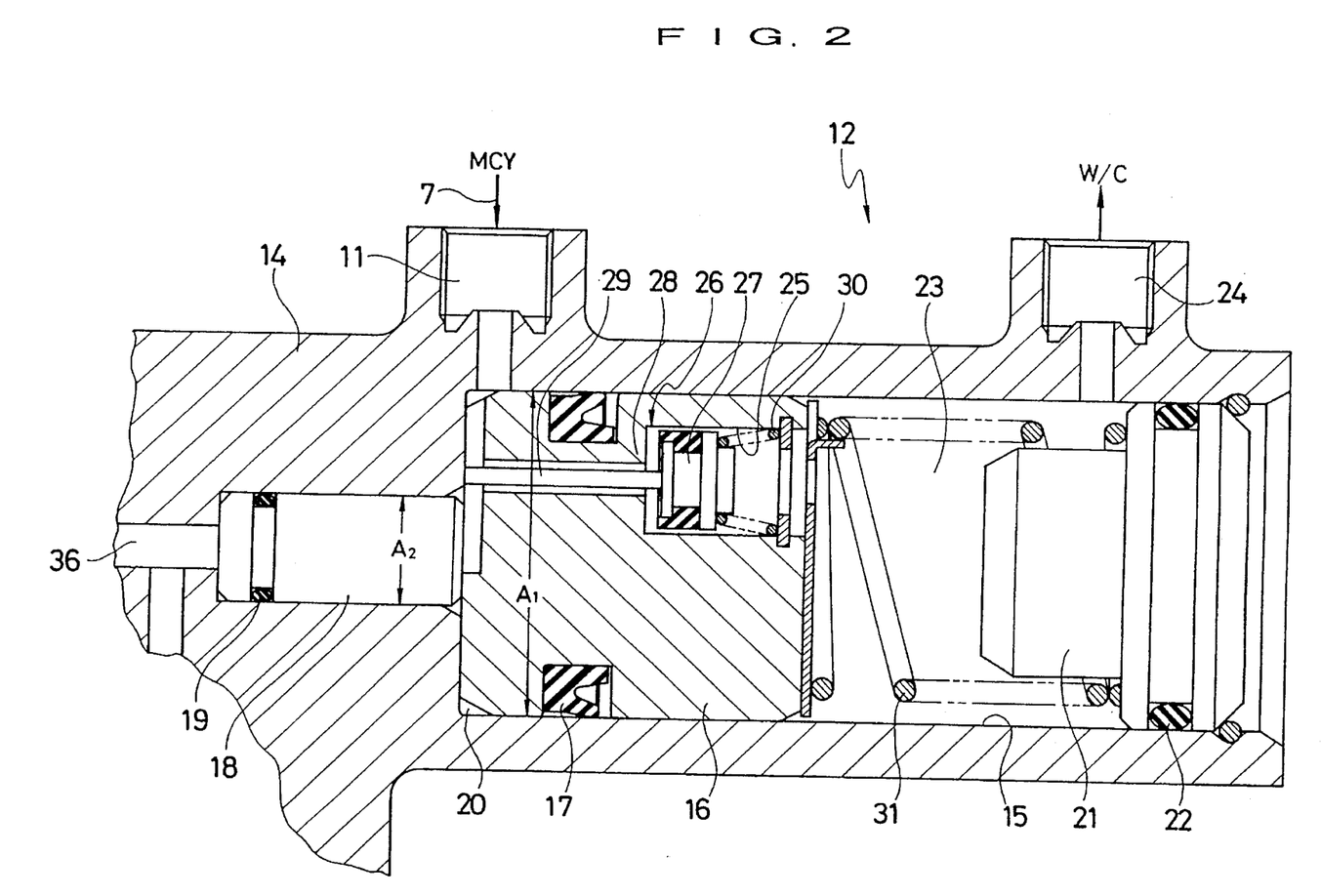
FIG. 2 is a partial enlarged sectional view of an automatic braking actuator in the embodiment shown in FIG. 1.

The first cylinder 10 and the second cylinder 12 are structured completely same and are arranged coaxially and symmetrically each other. As best shown in FIG. 2, the second cylinder 12 is provided with a second stepped hole 15 formed in a common housing 14 of the first, second, and third cylinders 10, 12, 13. The second cylinder 12 has a second large-diameter piston 16 which is slidably inserted into the large-diameter hole part of the second stepped hole 15 and sealed by a second cup seal 17, and a second small-diameter piston 18 which is slidably inserted into the small-diameter hole part of the second stepped hole 15 and sealed by a second small-diameter O ring 19. In this case, the second small-diameter piston 18 is arranged coaxially and in series with the second large-diameter piston 16.

The second cylinder 12 has a second master cylinder pressure introduction chamber 20, which is connected to the second inlet 11, formed in a portion of the second stepped hole 15 between the second large-diameter piston 16 and the second small-diameter piston 18. The master cylinder pressure (hereinafter, referred to as "MCY pressure") is introduced into the second master cylinder pressure introduction chamber 20 through the second outlet 5, the second brake path 7, and the second inlet 11. The open end of the second stepped hole 15 is sealingly closed by a second plug 21 and a second large-diameter O ring 22. There is a second automatic braking pressure developing chamber 23 formed in the second stepped hole 15 between the second plug 21 and the second large-diameter piston 16. The second automatic braking pressure developing chamber 23 communicates with second wheel cylinders (W/C) (not shown) via a second automatic brake actuator output 24.

The second large-diameter piston 16 is provided with a second stepped through-hole 25 which is formed by axially boring the second large-diameter piston 16 for connecting the second master cylinder pressure introduction chamber 20 to the second automatic braking pressure developing chamber 23, and a second center valve 26, which is normally opened, as a switch valve of the present invention for opening or closing the second stepped through hole 25. The center valve 26 comprises a second valve element 27 accommodated in the large-diameter hole of the second stepped through-hole 25, a second valve seat 28, formed on the stepped portion of the second stepped through-hole 25, on which the second valve element 27 can sit, a second rod 29 which extends from the second valve element 27 through the small-diameter hole of the second stepped through-hole 25 and is longer than that of the small-diameter hole of the second stepped through-hole 25, and a second valve element biasing spring 30 always biasing the second valve element 27 against the second valve seat 28. A second piston biasing spring 31 is disposed in the compressed state between the second large-diameter piston 16 and the second plug 21. The second large-diameter piston 16 is biased against the second master cylinder pressure introduction chamber 22 by the second piston biasing spring 31. In the non-braking state, the second large-diameter piston 16 is set to be in a non-operating position where the second large-diameter piston 16 is in contact with the stepped portion of the second stepped hole 15. When the second large-diameter piston 16 is in this non-operating position, the end of the second rod 29 is also in contact with the stepped portion of the second stepped hole 15 so that the second valve element 27 is spaced apart from the second valve seat 28 and the second center valve 26 is thus opened to open the second stepped through-hole 25.

Because the first cylinder 10 is structured the same as the aforementioned second cylinder 12, the detailed description thereof is omitted. For better understanding the components of the first cylinder 10 in the following description of the embodiment, the respective component of the first cylinder 10 are named substituting "first" for "second" of the name of the corresponding component of the second cylinder 12. In addition, the reference numerals of the components of the first cylinder 10 are added—'—after the reference numerals of the corresponding components of the second cylinder 12. That is, the components are a first stepped hole 15', a first large-diameter piston 16', a first cup packing 17', a first small-diameter piston 18', a first small-diameter O ring 19', a first master cylinder pressure introduction chamber 20', a first plug 21', a first large-diameter O ring 22', a first automatic braking pressure developing chamber 23', a first automatic braking actuator output 24', a first stepped through-hole 25', a first center valve 26', a first valve element 27', a first valve seat 28', a first rod 29', a first valve element biasing spring 30', and a first piston biasing spring 31'. It should be noted that some reference numerals of the above components of the first cylinder are not shown in figures, but such reference numerals are used for better understanding in the description of the embodiment.

Furthermore, the third cylinder 13 is, as shown in FIG. 1, provided with a third hole 32, formed in a housing 14 in the direction perpendicular to the first and second stepped holes 15' and 15, into which an automatic braking signal pressure developing piston 33 is sealingly and slidably inserted. An automatic braking signal pressure developing chamber 34 is formed in the third hole 32 above the automatic braking signal pressure developing piston 33. The automatic braking signal pressure developing chamber 34 is connected to reverse ends to the first and second master cylinder pressure introduction chambers 20', 20 of the first and second small-diameter pistons 18', 18 via a path 35 and a T-shaped path 36. The path 35 and the T-shaped path 36 comprises together an automatic braking signal pressure introduction path of the present invention. The automatic braking signal pressure developing piston 33 is set so that it is always biased downward by a return spring 37 and is located in a non-operating position, the lowest position of the third hole 32, during non-operation of the automatic brake.

A thrust generator 38 is secured to the lower end of the third cylinder 13. Though the thrust generator 38 is not shown in detail, it may be a well-known thrust generator for generating thrust by a power such as a vacuum, compressed air, liquid pressure, an electric motor or electromagnetic force, wherein an output rod 39 of the thrust generator 38 is in contact with the automatic braking signal pressure developing piston 33 to actuate the automatic braking pressure developing piston 33 through the output rod 39 by the generated thrust. The thrust generator 38 is electrically connected to an electronic control unit (hereinafter, referred to as "ECU") 40 which controls the operation of the thrust generator 38. In this case, the ECU 40 controls the closing and opening motion of an electromagnetic switching valve (not shown) when the power for actuating the thrust generator 38 is liquid pressure, controls a motor when the power source for actuating the thrust generator 38 is the motor, or controls the excitation of the electromagnetic solenoid when the power for actuating the thrust generator 38 is electromagnetic force. The ECU 40 computes based on signals from, for example, wheel speed sensors, a clutch stroke sensor, a clutch switch, a neutral switch, a stop lamp switch, a parking brake switch, and a door switch to determine if the vehicle is in the automatic braking condition. The automatic braking condition may be a condition for stating the vehicle on a sloping road, a condition for holding the braking state to wait a red light or in a traffic jam, a condition for operating a traction control, a condition for holding the vehicle in a stopped state on a sloping road, a condition for controlling the distance between the vehicle and the forward vehicle during running, a condition for controlling the speed of the vehicle, a condition for preventing the driver from forgetting to brake a side brake, or the like.

In the brake system with the automatic braking mechanism as structured above in accordance with this embodiment, when the illustrated normal brake and the automatic brake are in the non-operated state, the ECU 40 does not actuate the thrust generator 38 so that the thrust generator 38 outputs nothing. As a result of this, the automatic braking signal pressure developing piston 33, the first and second small-diameter pistons 18', 18, and the first and second large-diameter pistons 16', 16 of the automatic brake actuator 8 are all in the non-operated state, the first and second center valve 26', 26 are opened so that the automatic brake actuator 8 output nothing. Further, the brake pedal 1, the vacuum servo unit 2, and the tandem master cylinder 3 are also all in the non-operated state so that no normal braking pressure is developed.

In the shown state, upon pedaling the brake pedal 1 to actuate the normal brake, the vacuum servo unit 2 magnifies the force of pedaling the brake pedal 1 at a predetermined servo ratio and outputting the magnified force whereby the tandem master cylinder 3 develops MCY pressures $P_M$ in the two pressure chambers, respectively. One of the MCY pressures $P_M$ is supplied to the first inlet 9 of the automatic brake actuator 8 through the first outlet 4 and the first brake path 6 and further supplied, as a wheel cylinder pressure $P_W$ (hereinafter, referred to as "W/C pressure"), from the first inlet 9 to the wheel cylinders (W/C) of one of brake circuits through the first master cylinder pressure introduction chamber 20', the first stepped through-hole 25', the opened first center valve 26', the first automatic braking pressure developing chamber 23', and the first automatic brake actuator outlet 24' so that the wheel cylinders output braking force to actuate the normal brake on the wheel of the one brake circuit.

At the same time, the other MCY pressure $P_M$ is supplied to the second inlet 11 of the automatic brake actuator 8 through the second outlet 5 and the second brake path 7 and further supplied, as a W/C pressure $P_W$, from the second inlet 11 to the wheel cylinders (W/C) of the other one of brake circuits through the second master cylinder pressure introduction chamber 20, the second stepped through-hole 25, the opened second center valve 26, the second automatic braking pressure developing chamber 23, and the second automatic brake actuator outlet 24 so that the wheel cylinders output braking force to actuate the normal brake on the wheel of the other brake circuit.

Upon releasing the brake pedal 1 to cancel the normal brake, the vacuum servo unit 2 becomes in the non-operated state and the pressure chambers of the tandem master cylinder 3 are connected to a reservoir 3a so that the brake liquid supplied to the wheel cylinders of the brake circuits is returned to the pressure chambers and the reservoir 3a of the tandem master cylinder 3 through the first and second automatic brake actuator outlets 24', 24, the first and second automatic braking pressure developing chambers 23', 23, the first and second stepped through-holes 25', 25, the opened first and second center valves 26', 26, the first and second master cylinder pressure introduction chambers 20', 20, the first and second inlets 9, 11, the first and second brake paths 6, 7, and the first and second outlets 4,5, respectively, thereby releasing the normal brake.

In the illustrated non-braking state, when the ECU 40 determines based on the detected signals from the sensors that the vehicle is in the automatic braking condition, the ECU 40 actuates the thrust generator 38. Then, the thrust generator 38 generates thrust F whereby the automatic braking signal pressure developing piston 33 of the automatic brake actuator 8 advances upward through the output rod 39. By the advance of the automatic braking signal pressure developing piston 33, the automatic braking signal pressure is developed in the automatic braking signal pressure developing chamber 34 and introduced into the first and second small-diameter pistons 18', 18 through the path 35 and the T-shaped path 36. Therefore, the first and second small-diameter piston 18', 18 and the first and second large-diameter piston 16', 16 advance together. At the same time, the first and second valve elements 27', 27 of the first and second center valves 26', 26 sit on the first and second valve seats 28', 28, respectively, to close the first and second center valves 26', 26. The first and second small-diameter pistons 18', 18 and the first and second large-diameter pistons 16', 16 further advance, thereby developing the automatic braking pressures in the first and second automatic braking pressure developing chamber 23', 23. These automatic braking pressures are supplied as W/C pressures from the first and second automatic brake actuator outlets 24', 24 to the wheel cylinders, respectively, so that the wheel cylinders actuate the automatic brake on the corresponding wheels.

As the automatic braking condition is canceled, the ECU 40 makes the thrust generator 38 non-operated to extinguish the thrust F of the thrust generator 38. Then, the automatic braking signal pressure developing piston 33 moves downward by the return spring 37 to reach the non-operating position, thereby extinguishing the automatic braking signal pressure. Therefore, the first and second large-diameter pistons 16', 16 and the first and second small-diameter pistons 18', 18 reach the illustrated non-operating positions by spring forces of the first and second piston biasing springs 31', 31 so that the first and second center valves 26', 26 are opened. The first and second automatic braking pressure developing chamber 23', 23 are connected to the tandem master cylinder 3 which is now in the non-operated state so that the brake liquid supplied to the wheel cylinders of the brake circuits is returned to the tandem master cylinder 3 to cancel the automatic brake similarly to the aforementioned cancellation of the normal brake.

While the normal brake is actuated by pedaling the brake pedal 1, when the vehicle is in the automatic braking condition, the ECU 40 actuates the thrust generator 38 so that the thrust generator 38 outputs the thrust F and the automatic braking signal pressure is developed in the automatic braking signal pressure developing chamber 34.

Figure 3:
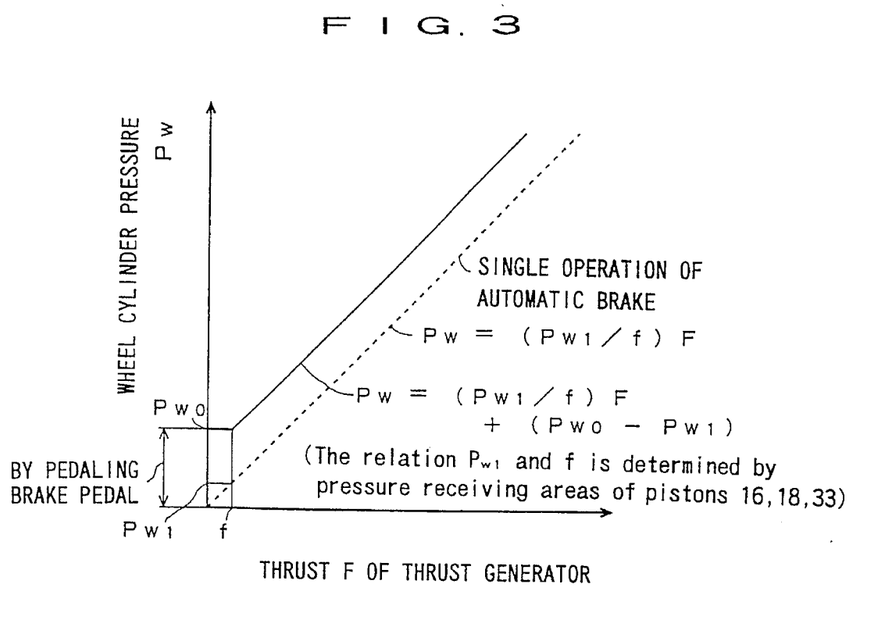
FIG. 3 is a diagram showing the relation between the thrust of a thrust generator and the wheel cylinder pressure when automatic brake is actuated while a normal brake is operating in the embodiment shown in FIG. 1.

At this point, since the normal brake is actuated by pedaling the brake pedal, MCY pressures $P_{MO}$ are introduced to the first and second master cylinder pressure introduction chambers 20', 20. At the same time, W/C pressures $P_{WO}$ are developed in the wheel cylinders, respectively. In this case, since both the first and second center valves 26', 26 are opened, the MCY pressures $P_{MO}$ and W/C pressures $P_{WO}$ of the first and second master cylinder pressure introduction chamber 20', 20 are equal to each other. In the first and second small-diameter pistons 18', 18, the MCY pressures $P_{MO}$ act in the direction of the T-shaped path 36. Accordingly, after starting the automatic braking by the ECU 40, while the thrust F of the thrust generator 38 is smaller than the thrust $f$ developing the automatic braking signal pressure equal to the MCY pressures $P_{MO}$, the first and second small-diameter pistons 18', 18 do not advance. Therefore, as shown in FIG. 3, the W/C pressures $P_{WO}$ do not change at all even when the thrust F increases so that the are held at the constant pressure corresponding to the amount of pedaling the brake pedal in the normal braking state.

As the thrust F of the thrust generator 38 exceeds the aforementioned thrust $f$, the first and second large-diameter pistons 16', 16 and the first and second small-diameter pistons 18', 18 advance together so that the first and second center valves 26', 26 are simultaneously closed. Therefore, the W/C pressures $P_{WO}$ increase in proportion to the increase of the thrust F of the thrust generator 38. In this case, in comparison to the single actuation of the automatic brake, the W/C pressures $P_W$ are increased by a pressure which is determined by subtracting the W/C pressures $P_{W1}$, developed when the thrust F of the thrust generator 38 during the automatic braking, from the W/C pressures $P_{WO}$ developed by pedaling the brake pedal. It should be noted that the relation between the thrust $f$ and the W/C pressures $P_{W1}$ is determined by pressure receiving areas $A_1$ of the first and second large-diameter pistons 16', 16, pressure receiving areas $A_2$ of the first and second small-diameter pistons 18', 18, and a pressure receiving area $A_3$ of the automatic braking signal pressure, that is, $$P_{W1}=[A_2/(A_1 \cdot A_3)] \cdot f.$$

In this manner, the automatic brake can be actuated even when the normal brake operates so that the braking force is increased by the automatic brake. Even if the normal brake is canceled from this state, the automatic brake operates and the first and second center valves 26', 26 are closed so that the automatic brake is held in the operating state. It should be noted that the operation of canceling the automatic brake after the normal brake is canceled is the same as that in case of single operation of the automatic brake.

Figure 4:
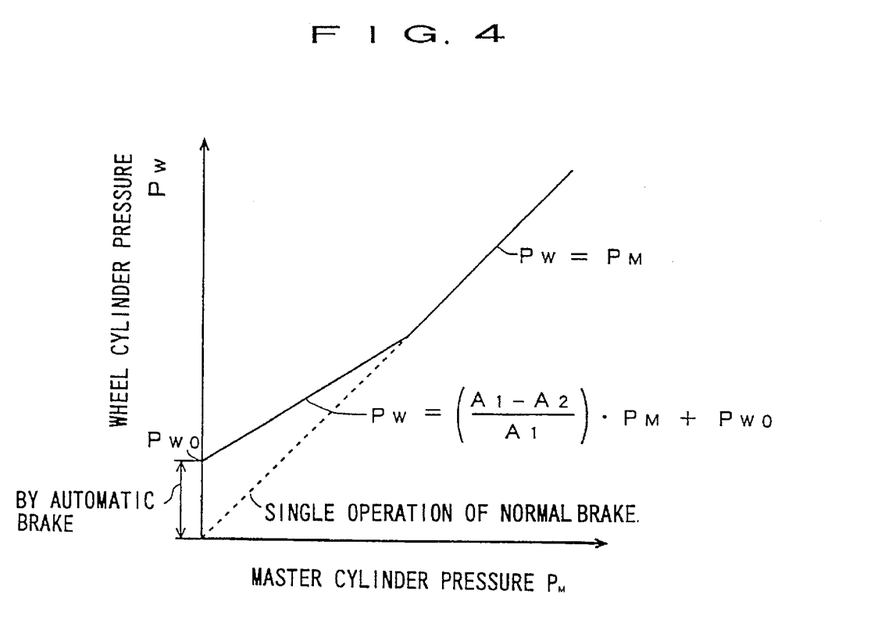
FIG. 4 is a diagram showing the relation between the master cylinder pressure and the wheel cylinder pressure when the normal brake is actuated while the automatic brake is operating in the embodiment shown in FIG. 1.

While the automatic brake is operating, as the normal brake is actuated upon pedaling the brake pedal 1 for increasing the braking force, the MCY pressures $P_M$ are developed in the pressure chambers of the tandem master cylinder 3 similarly to the above and the normal brake then operates as well as the automatic brake. Since the automatic brake operates at this point, the first and second center valves 26', 26 are closed, the automatic pressures are developed in the first and second automatic braking pressure developing chambers 23', 23, and the W/C pressures $P_{WO}$ equal to the automatic braking pressures are developed in the wheel cylinders. The MCY pressures $P_M$ developed upon pedaling the brake pedal are introduced into the first and second master cylinder pressure introduction chambers 20', 20. By the MCY pressure $P_M$, the first and second large-diameter pistons 16', 16 both are pressed in the forward directions so that the automatic braking pressures, i.e. W/C pressures $P_{WO}$ are further increased than the just before W/C pressures $P_W$. In this case, while the MCY pressure $P_M$ are smaller than W/C pressures $P_W$, the W/C pressures $P_W$ increase along a straight line represented by the following expression relative to the increase of the MCY pressures $P_M$. That is, $$P_W=[(A_1-A_2)/A_1] \cdot P_M + P_{WO}$$

wherein $A_1$ is the pressure receiving areas of the first and second large-diameter pistons 16', 16 and $A_2$ is the pressure receiving areas of the first and second small-diameter pistons 18', 18. Therefore, the MCY pressures $P_M$ acts in the direction of moving backward the first and second small-diameter pistons 18', 18 pushing the first and second large-diameter pistons 16', 16 by the automatic braking signal pressure so that the upgrade slope of W/C pressures $P_W$ become smaller than that in case of the single operation of the normal brake.

Furthermore, as the W/C pressures $P_W$ and the MCY pressures $P_M$ are equal to each other, the W/C pressures $P_W$ increase in proportion to the increase of the MCY pressures $P_M$.

In this manner, the normal brake can be actuated even when the automatic brake operates so that the braking force is increased by the normal brake. Even if the automatic brake is canceled from this state so that the first and second large-diameter pistons 16', 16 and the first and second small-diameter pistons 18' 18 all move backward and the first and second center valves 26', 26 are opened, the normal brake is held in the operating state since the brake pedal is pedaled. It should be noted that the operation of canceling the normal brake after the automatic brake is canceled is the same as that in case of single operation of the normal brake as mentioned above because the first and second center valves 26', 26.

In addition, the normal brake can be securely actuated by pedaling the brake pedal even when the thrust generator 38 or the third cylinder 13 for the automatic brake fails.

As mentioned above, according to the brake system with the automatic braking mechanism of this embodiment, while the normal brake is operating, the automatic brake can be securely actuated when the vehicle is in the automatic braking condition. In addition, while the automatic brake is operating, the normal brake can be actuated upon pedaling the brake pedal 1, for example, when the brake force by the automatic brake is not enough. At this point, the W/C pressures are increased immediately after pedaling the brake pedal 1 so that higher declarations are achieved by the normal braking, thereby improving the responsibility. Therefore, when the driver pedals the brake pedal to increase the brake force while the automatic brake is operating, the driver never senses the incongruity, thereby providing comfortable pedal feeling. In the high pressure range of the braking pressure, since the W/C pressures are equal to the MCY pressures and never exceed the MCY pressures, the withstanding pressure of the wheel cylinders which is the same as the conventional one is enough even with the automatic brake actuator 8 and the thrust generator 38. As a result, the conventional wheel cylinders can be used, thereby holding down the increase of the cost.

Furthermore, only one thrust generator 38 is enough since the thrust generator 38 is common to the two brake circuits. This also holds down the increase of the cost.

In addition, the normal brake can be retained even when the thrust generator 38 or the third cylinder 13 for the automatic brake fails. Therefore, the brake system of this embodiment has a fail-safe function.

In the above embodiment, though the automatic brake actuator 8 according to the present invention is provided to the two brake circuits, the automatic brake actuator 8 can be provided to only one of the two brake circuits. In this case, by making one of the two brake circuits corresponding to driving wheels, making the other brake circuit corresponding to coupled driving wheels, and providing the automatic brake actuator 8 and the thrust generator 38 to only the brake circuit corresponding to the driving wheels, a traction control dependent on the automatic brake can be effectively operated when a driving wheel slips.

Furthermore, the present invention can be applied not only a brake system with a dual circuit but also a brake system with a single brake circuit. In this case, it should be understood that the master cylinder is formed into a single configuration. Further, the vacuum servo unit is not necessarily provided so that it can be omitted.

Though the third cylinder 13 is formed integrally with the first and second cylinders 10, 12 in the above embodiment, the third cylinder 13 can be provided separately from the first and second cylinders 10, 12 and, in addition, the path 35 and the T-shaped path 36 can be structured using pipes such as tubes.

As apparent from the above description, according to the brake system with the automatic braking mechanism, the automatic brake can be actuated while the normal brake is operating so that the braking force can be increased by the automatic brake. The normal brake can be also actuated while the automatic brake is operating so that the braking force can be increased by the normal brake. In this case, by the operation of the automatic brake during the operation of the normal brake, the brake cylinder pressure can be higher than the brake cylinder pressure when only the automatic brake is actuated. In the actuation of the normal brake during the operation of the automatic brake, the normal brake can be actuated besides the automatic brake substantially at the same time that the driver pedals the brake pedal, thereby improving the responsibility. Therefore, when the driver pedals the brake pedal to increase the brake force while the automatic brake is operating, the driver never senses the incongruity, thereby providing comfortable pedal feeling.

Furthermore, the normal brake can be retained even when a component for the automatic brake fails and the automatic brake can be retained even when a component for the normal brake such as a master cylinder fails. Therefore, the brake system of the present invention has a fail-safe function.

What I claim is:

1. A brake system with an automatic braking mechanism comprising:

a brake operation member, a master cylinder for developing a master cylinder pressure by the operation of the brake operation member, a brake path for supplying said master cylinder pressure, brake cylinders for generating braking force for actuating a normal brake by receiving said master cylinder pressure, an automatic brake actuator provided in said brake path, a thrust generator for generating thrust starting said automatic brake actuator, and a control unit for controlling the actuation of said thrust generator, wherein said automatic brake actuator comprises a housing, a stepped hole which is formed in said housing and comprises of a large-diameter hole and a small-diameter hole, a large-diameter piston sealingly and slidably arranged into said large-diameter hole, a small-diameter piston sealingly and slidably arranged into said small-diameter hole, one end of which comes in contact with one end of said large-diameter piston to move said large-diameter piston forward, an automatic brake actuator inlet which is formed in said housing and communicates with an outlet of said master cylinder and with said large-diameter hole at one end side of said large-diameter piston through said brake path, an automatic brake actuator outlet which is formed in said housing and communicates with the brake cylinders and with said large-diameter hole at the other end side of said large-diameter piston, a switch valve which is normally opened to communicate said automatic brake actuator inlet with said automatic brake actuator outlet and is closed to block the communication between said automatic brake actuator inlet and said automatic brake actuator outlet when said large-diameter piston advances toward said automatic brake actuator outlet, an automatic braking signal pressure developing piston which is moved forward by being in contact with an output rod and by the thrust of said thrust generator, and an automatic braking signal pressure introduction path for introducing said automatic braking signal pressure to the other end of said small-diameter piston.

2. A brake system with an automatic braking mechanism as claimed in claim 1, wherein said switch valve is composed of a center valve mounted to said large-diameter piston.

3. A brake system with an automatic braking mechanism as claimed in claims 2, wherein said brake system comprises two brake circuits, said automatic brake actuator is arranged to said brake path of each brake circuit, and said automatic braking signal pressure introduction path is formed to introduce said automatic braking signal pressure to the other end of said small-diameter piston of each automatic brake actuator.

4. A brake system with an automatic braking mechanism as claimed in claim 3, wherein each automatic brake actuator is arranged in said a housing, said automatic braking signal pressure introduction path and said automatic braking signal pressure developing piston are disposed in said housing, said large-diameter piston and said small-diameter piston of each automatic brake actuator are coaxially arranged in said housing, and said automatic braking signal pressure introduction path is formed in a T-shaped path to communicate to the other end of said small-diameter piston of each automatic brake actuator.

5. A brake system with an automatic braking mechanism as claimed in claim 4, wherein a power source of said thrust generator is a vacuum, compressed air, liquid pressure, power generated by an electric motor, or electromagnetic force.

6. A brake system with an automatic braking mechanism as claimed in claim 1, wherein a power source of said thrust generator is a vacuum, compressed air, liquid pressure, power generated by an electric motor, or electromagnetic force.

7. A brake system with an automatic braking mechanism as claimed in claim 6, wherein said switch valve is composed of a center valve mounted to said large-diameter piston.

8. A brake system with an automatic braking mechanism as claimed in claims 1, wherein said brake system comprises two brake circuits, said automatic brake actuator is arranged to said brake path of each brake circuit, and said automatic braking signal pressure introduction path is formed to introduce said automatic braking signal pressure to the other end of said small-diameter piston of each automatic brake actuator.

9. A brake system with an automatic braking mechanism as claimed in claim 8, wherein a power source of said thrust generator is a vacuum, compressed air, liquid pressure, power generated by an electric motor, or electromagnetic force.

10. A brake system with an automatic braking mechanism as claimed in claim 8, wherein each automatic brake actuator is arranged in said a housing, said automatic braking signal pressure introduction path and said automatic braking signal pressure developing piston are disposed in said housing, said large-diameter piston and said small-diameter piston of each automatic brake actuator are coaxially arranged in said housing, and said automatic braking signal pressure introduction path is formed in a T-shaped path to communicate to the other end of said small-diameter piston of each automatic brake actuator.

11. A brake system with an automatic braking mechanism as claimed in claim 10, wherein said switch valve is composed of a center valve mounted to said large-diameter piston.

12. A brake system with an automatic braking mechanism as claimed in claim 10, wherein a power source of said thrust generator is a vacuum, compressed air, liquid pressure, power generated by an electric motor, or electromagnetic force.

* * * * *